United States Patent [19]
Kochy et al.

[11] Patent Number: 4,889,386
[45] Date of Patent: Dec. 26, 1989

[54] REAR SEAT FOR MOTOR VEHICLES

[76] Inventors: Fritz Kochy, Schlesische Strasse 24, 6500 Mainz; Bernhard Neumann, Bohmerwaldstrasse 2, 6090 Russelsheim 7; Rolf Horn, Nibelungenstrasse 26, 6090 Russelsheim, all of Fed. Rep. of Germany

[21] Appl. No.: 336,554

[22] Filed: Apr. 10, 1989

Related U.S. Application Data

[63] Continuation-in-part of Ser. No. 90,786, Aug. 8, 1987, abandoned.

[30] Foreign Application Priority Data

Aug. 22, 1986 [DE] Fed. Rep. of Germany ....... 3628587

[51] Int. Cl.⁴ ............................................. B60N 1/06
[52] U.S. Cl. ................................. 297/359; 297/115; 297/361; 297/367
[58] Field of Search .............. 297/115, 117, 359, 360, 297/361, 366, 367, 363, 417

[56] References Cited

U.S. PATENT DOCUMENTS

| | | | |
|---|---|---|---|
| 2,962,087 | 11/1960 | Barecki et al. | 297/367 |
| 3,778,103 | 12/1973 | Edwards | 297/359 X |
| 3,888,540 | 6/1975 | Protze et al. | 297/117 X |
| 4,601,515 | 7/1986 | Habsutta et al. | 297/117 X |
| 4,685,736 | 8/1987 | Tanaka et al. | 297/366 |

FOREIGN PATENT DOCUMENTS

| | | | |
|---|---|---|---|
| 2448770 | 4/1976 | Fed. Rep. of Germany | 297/417 |
| 1177183 | 9/1985 | U.S.S.R. | 297/366 |

Primary Examiner—Peter R. Brown
Attorney, Agent, or Firm—Ernest E. Helms

[57] ABSTRACT

The operating elements for adjusting the tilt of the back rest of the rear seat of a motor vehicle shall be disposed in an area which is easily accessible and permits adjustment of the back rest by the passenger in the sitting position during the ride. This is achieved in that the operating elements of the adjuster are disposed in the area of the opening for the center arm rest that can be folded down from the back rest. It is especially advantageous if the arm rest in the folded-up position conceals the operating elements. It is also possible to integrate the operating elements in the center arm rest and to adjust the tilt of the back rest by moving the arm rest up and down.

1 Claim, 3 Drawing Sheets

REAR SEAT FOR MOTOR VEHICLES

This is a continuation-in-part of application Ser. No. 090,786 filed on Aug. 8, 1987, now abandoned.

The present invention pertains to a rear seat for motor vehicles with adjustable back rest in the center of which is located a folding central arm rest. This application incorporates the disclosure of Putsch et al. U.S. Pat. No. 3,432,881.

A rear seat for motor vehicles with a passenger compartment and a luggage space separated from it by tilting back rest is already known (DE-OS No. 28 48 268), in which the back rest is provided with tilting means which are adjustable to change the tilt angle of the back rest. The operating element for the tilting means is located in the upper central portion of the rear side of the back rest and is connected with the tilting means via a left and a right control cable within the back rest. By disposing the operating element in the upper portion of the rear side of the back rest, the said back rest cannot be reached by a passenger sitting on the rear seat; he is forced to stand up to adjust the back rest. Arrangement of the operating element on the outside of the seat, as in the case of the front seat, is not possible because of space limitations in the case of the rear seat.

Therefore, the task of the present invention is to dispose the operating elements for adjusting the back rest of the rear seat in an area which is easily accessible and also permits adjustment of the back rest while sitting during the ride. This is achieved according to the present invention in an advantageous manner so thst the operating elements for the back rest adjuster are disposed in the area of the opening for the arm rest. It is especially advantageous if the arm rest in its folded-up position conceals the operating elements.

The arrangement of the operating elements according to the present invention has the advantage that the back rest can be adjusted easily and infinitely even during the ride. Due to the good accessibility, it is also possible to adjust the lordosis supports on the rear seats. Consequently, the back rest adjuster can be operated in an ergometrically satisfactory manner in every respect. The adjuster according to the present invention and its operating elements can be manufactured and installed easily and at low cost, so that the requirement concerning economical mass production is satisfied.

According to an advantageous further improvement of the present invention, the operating elements for the back rest tilt adjuster are designed so that it is possible to integrate the operating elements in the center arm rest and to adjust the tilt of the back rest by moving the arm rest up and down.

A ratchet is used for operation, which also permits free swing travels for tilting the back rest forward or backward (loading position and lying position, respectively), the ratchet lever needed for this purpose can also be arranged behind the center arm rest due to an additional home position. The iron mounting does not interfere with the function and is also not visible. In addition, it is also possible to provide a lordosis support on the rear seats.

Further characteristics and advantages of the present invention can be found in the subclaims as well as in the drawing and the corresponding description of the drawing. The drawing shows an embodiment according to the present invention:

Figure 3:
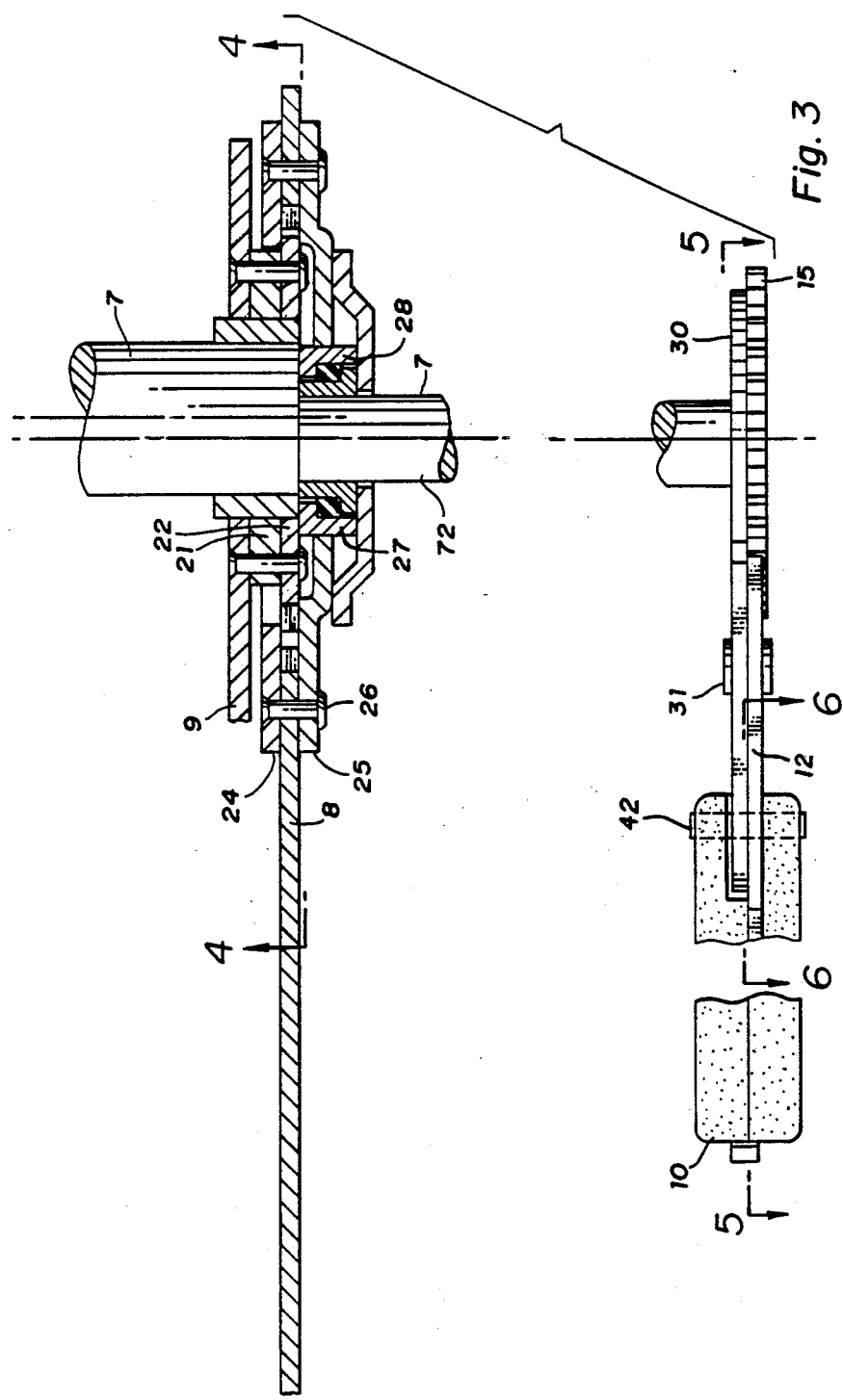
FIG. 3 is a sectional view with some portions shown in side elevation of the adjuster mechanism.
Figure 4:
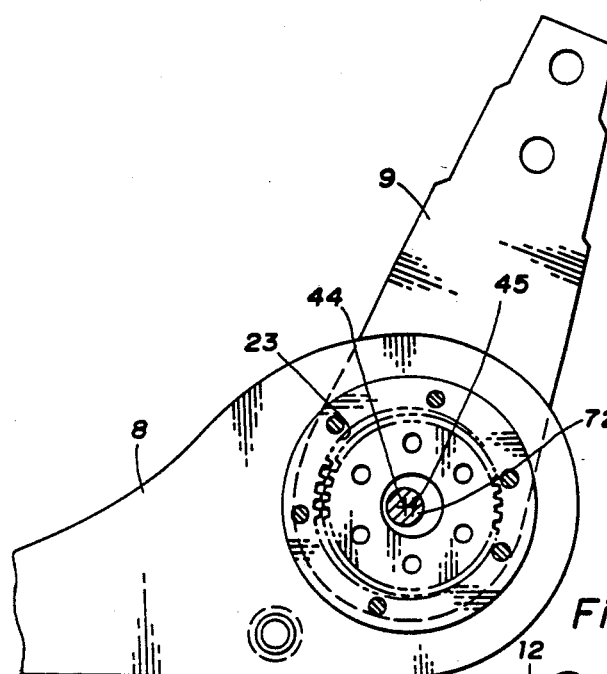
Figure 5:
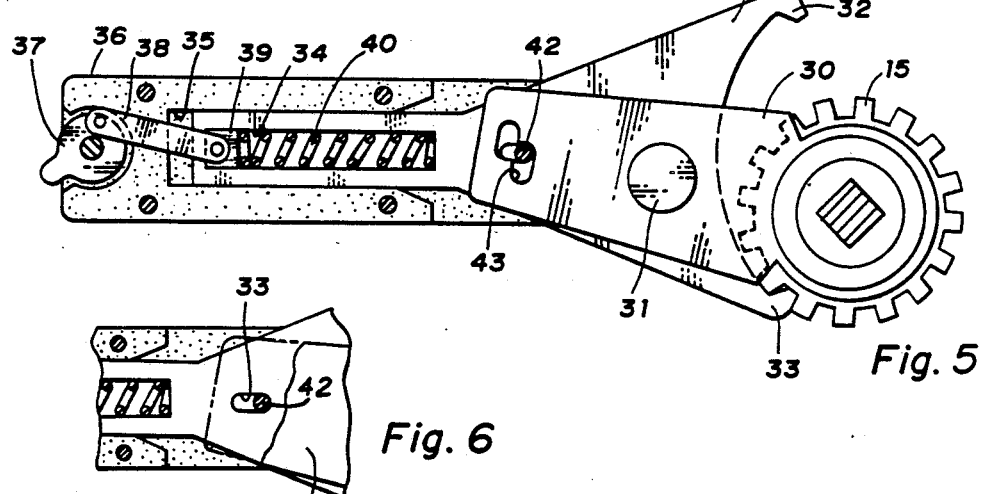
Figure 6:
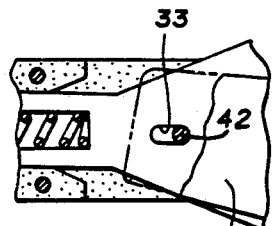
Figure 7:
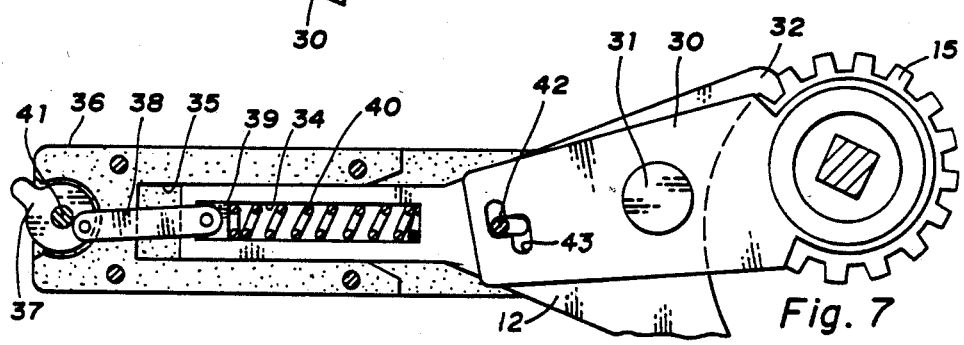

FIGS. 4, 5 and 6 are views taken along lines 4—4, 5—5 and 6—6 respectfully of FIG. 3;

FIG. 7 is a view similar to FIG. 5 showing the ratchet adjusted to the opposite position.

Figure 1:
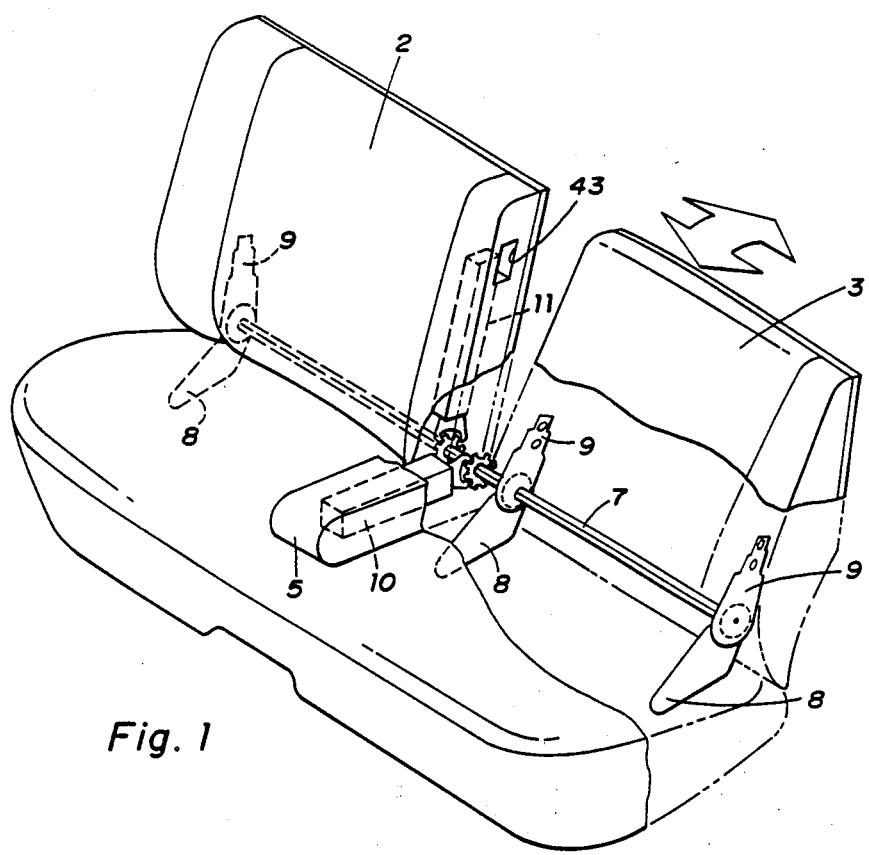
FIG. 1 shows a perspective view of the rear seat of a motor vehicle with a split back rest.

FIG. 1 shows a rear seat with split back rest. However, the present invention can also be used in the case of non-split back rests. The rear seat consists of a seat part 1 with two adjustable back rest parts 2 and 3. In the center between the two back rest parts 2 and 3 is located the center arm rest, which also consists of two parts 4 and 5, in an opening or recess 6, with the part 4 being shown in the folded-up position and part 5 in the folded-down position. In the lower area of the back rest parts 2 and 3 is mounted the shaft 7 in iron mountings 8 attached to the bottom of the vehicle, and it is connected with the back rest parts 2 and 3 via mounting parts 9. The two parts 4 and 5 of the center arm rest, into which the ratchet lever 10 or 11 is integrated, are also mounted on the shaft 7.

Referring further to FIGS. 3-7 iron mounting 8 mounting part 9 mounted to shaft 7 (Note the iron mounting 8 and mounting part 9 associated with ratchet lever 11 are not shown in FIG. 1 for clarity of illustration, however, it is identical and symmetrical with the mounting associated with arm rest 5.). Mounting part 9 is fixably connected with a disc 21 and a spur gear 22, a bore 23 is cut in iron mounting 8 and is provided with inward spacing teeth having at least one tooth greater than the number of teeth on the spur gear 22. Spur gear 22 will have at least one tooth in engagement with the teeth provided in the bore 23 of the iron mounting 8. Iron mounting 8 is fixably connected by pin 26 with disc 24 and disc 25. Disc 25 mounts two half bearings 27 and 28. Half bearings 27 and 28 mount a portion 72 of shaft 7. Portion 72 extends to and is fixably connected with ratchet wheels 15. Adjacent to the ratchet wheel 15 is a bearing plate 30 with a pin 31. The bearing plate 30 mounts the ratchet lever 10 to the shaft 7 via the shaft portion 72.

The ratchet lever 11 has a rotatable armerature or pawl 12. Pawl 12 has teeth 32 and 33 for engagement with the ratchet wheel 15 and also has a slot 33 and a troove 34. Pawl 12 is slidably mounted within a groove 35 of a ratchet handle 36. Ratchet handle 36 also has pivotally connected thereto an indicator pin 37. Indicator pin 37 is pivotally connected to a link 38 which is in turn pivotally connected to a stop member 39 which is trapped within groove 34. The groove 34 of the pawl is fitted with a compression spring 40. Handle 36 has top and bottom halves joined by a pin 41 extending through indicator pin 37 and a forward pin 42. The ratchet lever 11 is incorporated into the center arm rest 4, as clearly shown in FIG. 1, a cut out 43 is provided allowing for access to the indicator pin 37.

When desiring to raise the back rest 2, the indicator pin 37 is switch as shown in FIG. 5 causing the pawl 12 to be pulled to the left with respect to the handle 36. This causes pin 42 which is captured by a slot 33 of the pawl and a Z-shaped slot 43 of the bearing plate to be placed in a lower portion (more adjacent to ratchet wheel 15) of the Z-shaped groove as shown in FIG. 5. The pawl 12 pivots on pin 31 to engage tooth 33 with ratchet wheel 15 upon downward movement of the arm rest 4 causing the ratchet lever to torsion shaft 7 in a counterclockwise rotation. Upon upward movement of arm rest 4 ratchet lever 11 will pull up and pin 42 will pull up to central portion of the slot 43 whereby tooth 33 of the pawl tooth 33 will disengage from the ratchet wheel 15 and the arm rest 4 can be pulled up to a position to where it can again be pushed down to torsion the shaft 7. Movement of indicator wheel 37 to the alternate position will make stopper 38 compress spring 40 to push pawl 12 to the right with respect to handle 36 causing pin 42 to be positioned in the opposite end of slot 43 and now upward movement of the arm rest 4 will torsion of shaft 7 clockwise. The torsion of shaft eccentric portion 72 will cause a pivotal movement of portion 72 along axis 44 which is aligned with bore 23. The center of spur gear 22 is axis 45 which will orbit with respect to axis 44. Therefore circular motion of the spur gear 22 with respect to the gear teeth of bore 23 will occur thereby adjusting the angular position of mounting means 9 while still causing the position of the back rest 2 to be locked with position of the seat (iron mounting plate 8).

Figure 2:
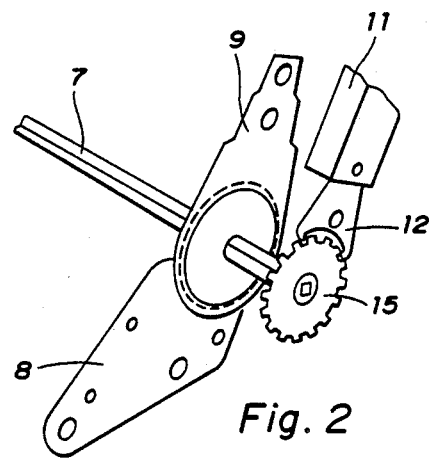
FIG. 2 shows a schematic of FIG. 1 with the adjuster of the arm rest in the raised position in FIG. 1.

The ratchet lever 10 or 11 meshes with the ratchet wheel 15 (FIG. 2) via a rotatable armature 12, so that the back rest part 3 is adjusted incrementally while the part 5 of the center arm rest is moved up or down. This also applies to the back rest part 2. Consequently, both back rest parts 2 and 3 can easily be brought into the desired position while sitting during the ride.

The present invention was explained above in more detail on the basis of the example illustrated in the drawing. However, it is by no means limited to this example, since there are various possible modifications in terms of the design of the individual parts of the back rest and its adjuster as well as in the arrangement of the individual parts without going beyond the scope of the present invention.

The embodiments of the invention in which an exclusive property or privilege is claimed are defined as follows:

1. A rear seat for motor vehicles with an adjustable back rest mounted on a shaft through a rotary gear type adjuster means, said adjuster means including a gear member mounted on said shaft, in the center of said back rest is located a folding center arm rest, said folding center arm rest is mounted on said shaft, said rear seat characterized in that the operating elements for said adjuster means of said back rest are disposed in the region of the opening for said center arm rest and that said center arm rest conceals the operating elements for the back rest adjuster means, and said adjuster means is constructed as a ratchet means and is incorporated into the center arm rest to engage said gear member mounted onto said shaft, and the tilt of the back rest is adjusted by moving said center arm rest up and down, and a ratchet lever for controlling said ratchet means is incorporated into said center arm rest.

* * * * *